(No Model.) 3 Sheets—Sheet 1.
R. EICKEMEYER.
MAGNETIC GAGE FOR TESTING THE MAGNETIC CONDUCTIVITY OF METALS.
No. 413,338. Patented Oct. 22, 1889.
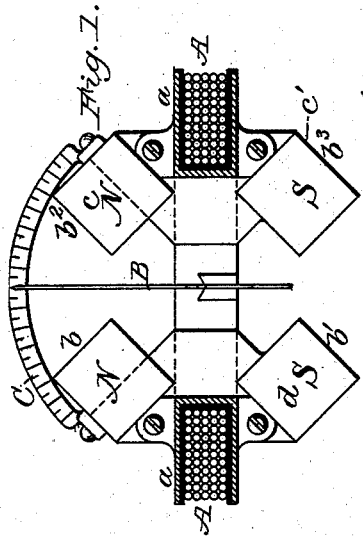
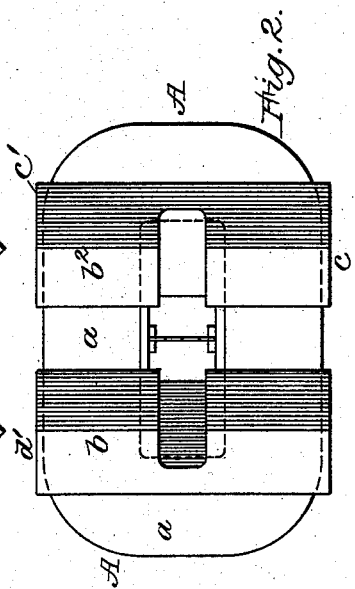
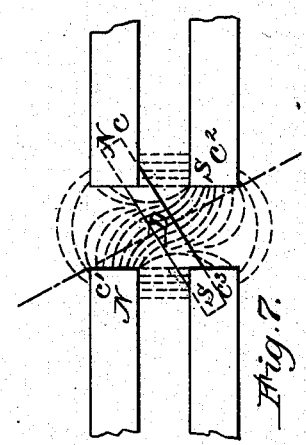
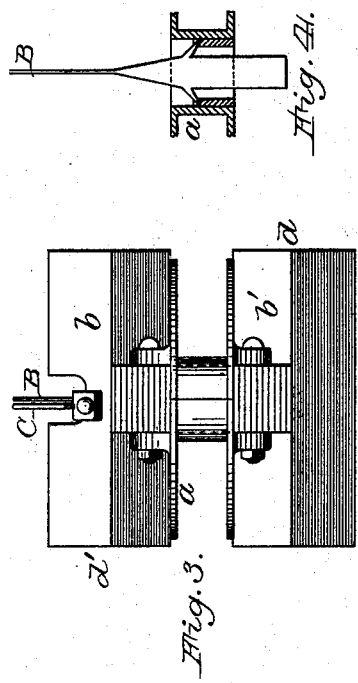
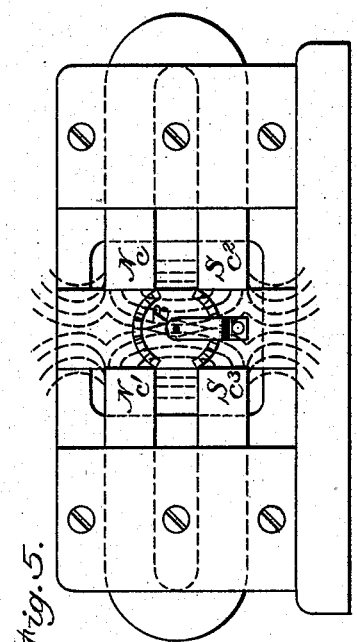
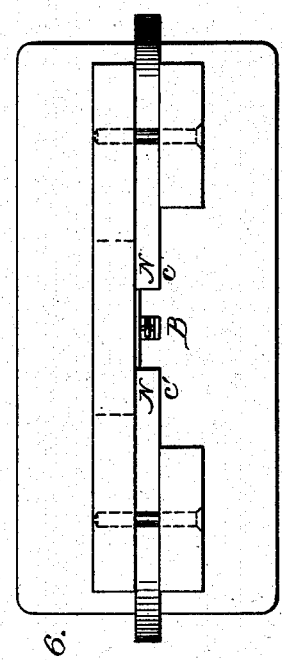
Attest:
Philip F. Larner.
Howell Bartle.
Inventor:
Rudolf Eickemeyer.
By McM... attorney.

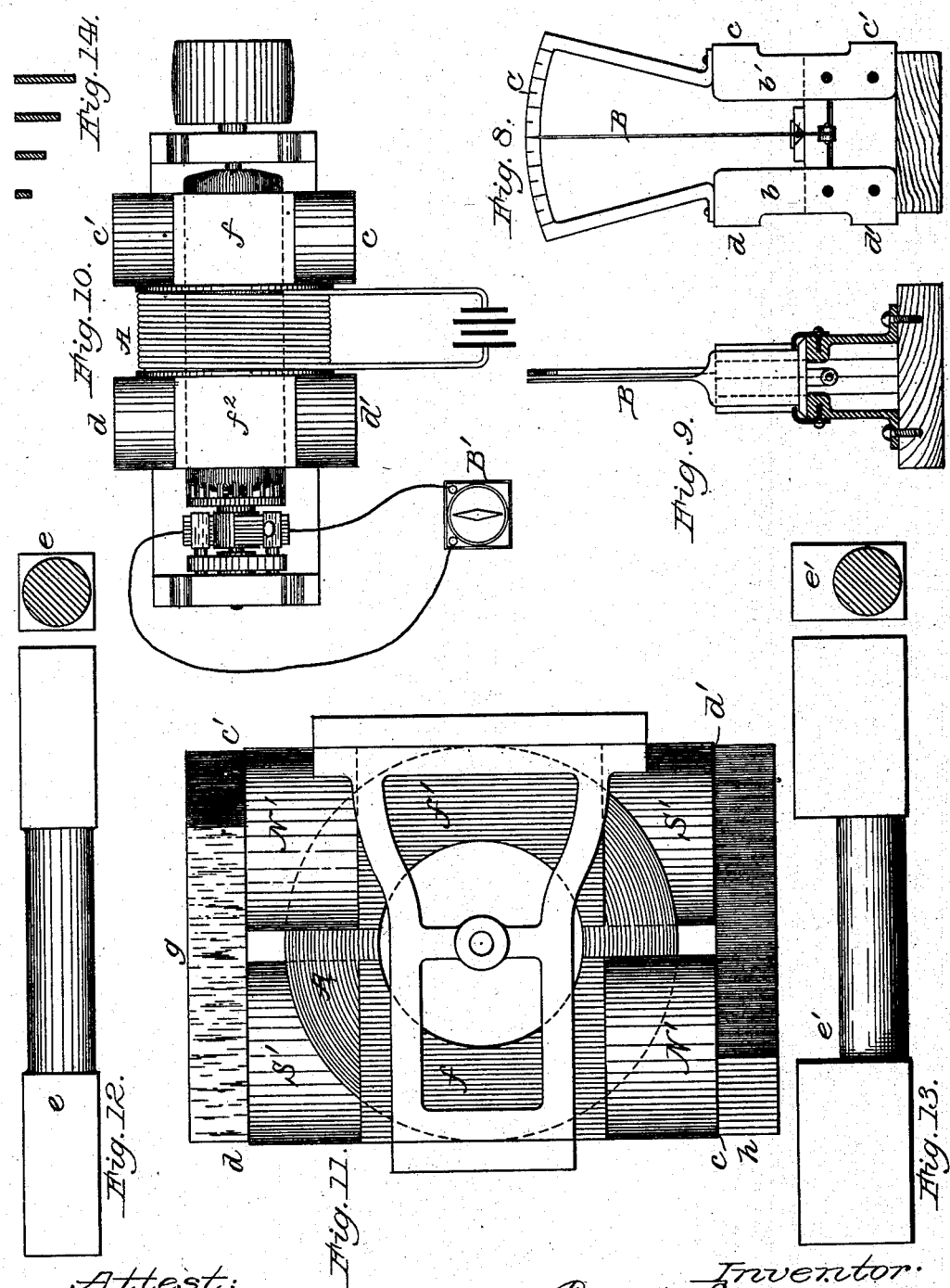

(No Model.) 3 Sheets—Sheet 3.
R. EICKEMEYER.
MAGNETIC GAGE FOR TESTING THE MAGNETIC CONDUCTIVITY OF METALS.
No. 413,338. Patented Oct. 22, 1889.
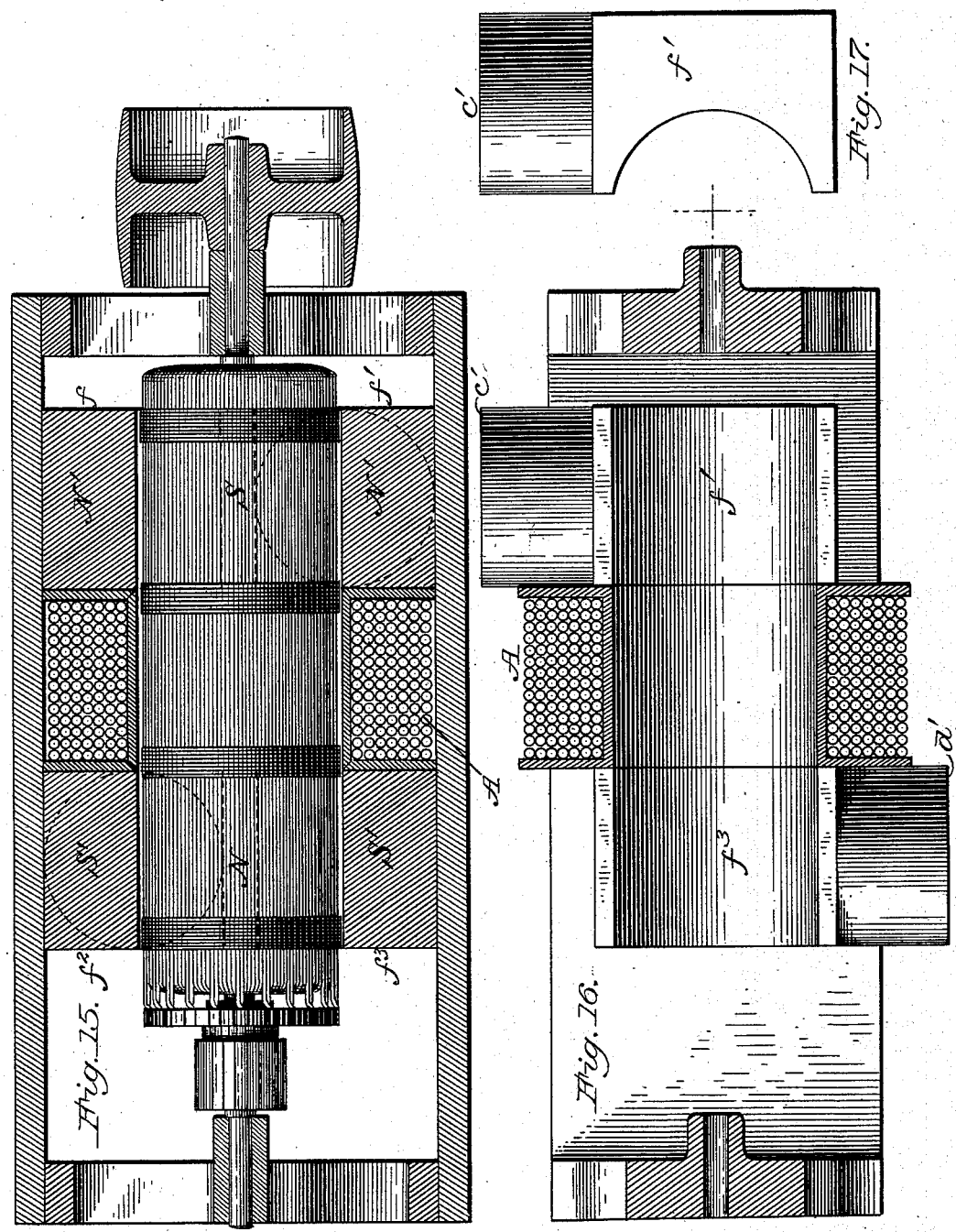

UNITED STATES PATENT OFFICE.

RUDOLF EICKEMEYER, OF YONKERS, NEW YORK.

MAGNETIC GAGE FOR TESTING THE MAGNETIC CONDUCTIVITY OF METALS.

SPECIFICATION forming part of Letters Patent No. 413,338, dated October 22, 1889.

Application filed February 23, 1889. Serial No. 300,812. (No model.)

*To all whom it may concern:*

Be it known that I, RUDOLF EICKEMEYER, of Yonkers, in the county of Westchester and State of New York, have invented a certain new and useful Magnetic Gage for Testing the Magnetic Conductivity of Metals; and I do hereby declare that the following specification, taken in connection with the drawings furnished and forming a part of the same, is a clear, true, and complete description of the several features of my invention.

It is well known that many of the variable conditions of various metals and alloys are accompanied by variations in magnetic conductivity, and it is also known that there are wide variations in the magnetic conductivity of the various kinds of iron and steel, and it is obvious that an accurate knowledge of the character of metal in this respect is of great value in the construction of machines wherein magnetism is to be involved—as, for instance, the presence of certain impurities or the lack of density, or the absence of certain elements or ingredients from a metal, or an alloy which should contain said elements sometimes in exact proportions are each accompanied by variations in magnetic conductivity; and the object of my invention is to provide what I will term a "magnetic gage," whereby any metal to be tested may be accurately compared with standard metal of the same general kind, or with other kinds of metal, with respect of magnetic conductivity.

I have devised my magnetic gages in various forms; but each essentially involves at least one pair of magnetic or contact faces of opposite polarity and included in a magnetic field, and which are adapted to be conveniently and accurately bridged or coupled for varying said field, in combination with an indicator, which is normally maintained in position by the magnetic field in its normal condition and is changed in position by variations in said field, so that when a piece of metal is applied to two of said contact-faces, after the manner of a bridge or coupler, the magnetic field will be varied and cause a corresponding variation in the position of the indicator, the extent of the movement of the latter being dependent upon the magnetic conductivity of the metal applied to said contact-faces.

For special convenience and accuracy in comparing the magnetic conductivity of two pieces of metal I employ two pairs of said contact-faces, so that having applied one piece of metal to one pair of faces of opposite polarity and observing the resulting change in the position of the indicator I can apply the second piece of metal to the other pair of faces and observe as to the return of the indicator toward its normal position. In some of my gages these four contact-faces are afforded by two separate simple magnets, and in others by more or less complex magnets, and in some forms permanent magnets are used and in others electro-magnets. As to the indicator, it may be variously constructed and arranged, provided its movements will only result from variations in the magnetic field, and in some of my gages the indicator is a magnetic needle or pointer, which is directly influenced by a magnetic field, because located between the poles of magnets or parts of magnets which afford said contact-faces; but in others of my gages I employ as an indicator an ordinary galvanometer in an electric circuit, which is varied according to variations in the magnetic field, and these latter variations depend upon the application of magnetic metal to contact-faces afforded by the magnet or magnets from which said field is derived. This arrangement of the indicator will enable much finer tests to be made than when the indicator is directly influenced by magnetism as distinguished from directly influencing the indicator by an electric current, which in turn is directly influenced by magnetism, as in the case of the galvanometer, which is therefore in fact a magnetic indicator indirectly influenced by the magnetic field of the gage.

To more particularly describe my invention I will refer to the accompanying drawings, in which—

Figure 1 illustrates, partly in end view and partly in cross vertical section, one of my magnetic gages containing electro-magnets. Fig. 2 is a plan view of the same, but having the graduated indicator-plate detached. Fig. 3 is a side view of the same with the field-coil removed. Fig. 4 illustrates the indicator-needle in side view and its bearings in section. Figs. 5 and 6, in side elevation and plan view, illustrate one of my gages containing permanent horseshoe-magnets, and in Fig. 5 a series of heavy dotted lines indicate the general character of the magnetic lines adjacent to the poles of the magnets in a central magnetic field. Fig. 7 illustrates the four poles of the two magnets of Fig. 5, and a test piece of metal applied to diagonally-opposite poles, and the consequent varied magnetic lines in the central field, and the position of the indicator are all indicated in dotted lines. Figs. 8 and 9, in side view and cross-section, illustrate one of my gages embodying two permanent bar-magnets. Fig. 10, in plan view, illustrates one of my gages having an electro-magnet and provided with a revolving armature and a galvanometer arranged to operate as a magnetic indicator. Fig. 11 is an end view of the magnetic portion of the gage, Fig. 10, on an enlarged scale. Figs. 12 and 13 illustrate desirable forms of pieces of metal prepared for use as specimen standards. Fig. 14, in section, illustrates a series of such pieces of metal as may be used for determining what additions of metal should be made to any one test-piece of metal for rendering it of the same magnetic conductivity as another test-piece already applied to the gage. Fig. 15 is a longitudinal vertical section of the gage, Fig. 10, with the revolving armature in position. Fig. 16 is a longitudinal horizontal central section of the same with the armature removed. Fig. 17, in side view, illustrates one of four cheek-pieces, which afford the desired contact-faces in the gage, Fig. 10.

Referring to Figs. 1 to 4, inclusive, it will be seen that a horizontal exciting-helix A occupies a spool-like frame $a$, of iron, to which four counterpart iron bars $b$ $b'$ $b^2$ $b^3$ are attached, two of these being above and two below the coil, so that when said coil is excited the two upper bars will be of one polarity—for instance, N and the two lower bars S. Each of these bars at its end affords magnetic contact-faces, and, although there are eight of these faces, either of the upper faces can be relied upon for more or less reliable duty in connection with the face below it on the same side; but better results will accrue, if for instance, the upper face $c$ co-operates with the diagonally-opposite face $d$ on the same side, and in connection with those faces for obtaining certain results the opposite ends of the other two bars having the diagonally-opposite contact-faces $d'$ and $c'$ are used. The indicator B is a magnetic needle mounted upon knife-edge bearings in the center of the frame $a$ and is normally maintained in a vertical position by the magnets when in their normal condition, and is deflected to the one side or the other by variations in the central magnetic field, as will be hereinafter more fully described. A graduated plate C is mounted on top of the upper bars, and the point of the indicator-needle can swing toward and from the ends of said plate, the upper bars being laterally slotted or cut away centrally to afford a path for the needle.

In the gage shown in Figs. 5 and 6 there are two permanent horseshoe-magnets mounted edgewise in a suitable non-magnetic frame, so that their poles are coincident, the two N poles occupying one upper horizontal plane and the two S poles a lower plane, and affording between them a space in which an indicator B and graduated plates are located. The heavy dotted lines adjacent to the poles of these magnets indicate the character of the magnetic lines normally present, and it will be seen that there is between the magnets a central magnetic field, in which the magnetic lines are parallel, and hence the needle in said field will normally stand in a vertical position opposite appropriate scale-marks on the graduated plate at what may be termed the "zero-points." It will also be obvious that there is an external or outer magnetic field, within which the contact-faces are located. In this gage the two sides of the two ends of both magnets serve as eight contact-faces, as at $c$ $c'$ $c^2$ $c^3$ on one side, the other side affording four other contact-faces.

In connection with Fig. 7 the operation of my magnetic gages will be clearly explained. In said figure the four ends or poles of the two magnets of Fig. 5 are shown; but in this case a test-piece D, of magnetic metal, has been applied to the rear contact-faces of diagonally-opposite poles N S, and as a result thereof the arrangement of the central magnetic field is (as indicated in curved dotted lines) changed from the normal condition or arrangement indicated in Fig. 5, and as a consequence the indicator-needle will be swung into a diagonal position, or respectively toward those poles N and S which are not coupled by the test-piece, as illustrated by the straight dotted line in this view Fig. 7. The extent of movement by the indicator-needle will be evidenced by the graduated plate or plates, and this in one way discloses the magnetic conductivity of a test-piece D. If, now, another piece of metal is to be carefully compared with the piece already in position, it must be of corresponding dimensions and applied to the opposite or front contact-faces and diagonally to the position of the first piece, and if the two pieces of metal be of the same magnetic conductivity one will balance the other, and the needle will therefore resume its normal position. If, however, one piece differs from the other, the degree of difference will be indicated by the position of the needle, and then, for ascertaining what increase of dimension in cross-section the deficient piece should have to make it equal to the better piece, I add smaller thin pieces of the same metal—say such as are shown in section in Fig. 14—until the indicator stands at zero. In like manner are test-pieces applied to the contact-faces of the gage Fig. 1, the indicator operating therein in the same manner, although that gage is more satisfactory in its operation, because it has an electro-magnet. I deem it desirable to provide a series of standard pieces of metal, one each of several kinds of iron and of steel and of alloys and of metals generally for enabling ready comparison of any two kinds or varieties of metal either as to their magnetic or diamagnetic or non-magnetic properties. Such standard pieces should be of uniform dimensions and form, and I find the forms $e$ $e'$ (shown in Figs. 12 and 13) to be specially desirable and convenient.

In Figs. 8 and 9 I show one of my gages, in which two permanent vertical bar-magnets $b$ and $b'$ are employed, and in the central field between them an indicator B, having a weighted lower end, is mounted, so as to be normally maintained in a vertical position, and to stand with its point at zero on the graduated plate C. Each magnet has two contact-faces $c$ $c'$ and $d$ $d'$, and in this case pieces of metal to be tested are or may be restricted to the contact-faces of one or the other of the two magnets—as, for instance, a piece of metal placed upon the contact-faces $c$ $c'$ will cause the top of the indicator to be deflected, and by the placing of another piece of metal upon the contact-faces $d$ $d'$ the indicator will resume its normal position if the two pieces of metal have the same magnetic conductivity, and if not they can be balanced by the addition of pieces of metal to the deficient piece, as before described.

The magnetic gage shown in Figs. 10, 11, 15, and 16 is in one of the more complex forms devised by me; but it contains all of the essential magnetic characteristics embodied in either one of the forms already described, and it also contains certain additional features which enable it to operate with great precision and to indicate minute variations in the magnetic conductivity of metals tested thereon. In this gage four contact-faces are provided, two on each side of the gage, as indicated at $c$ $d'$ and $c'$ $d$. Each of these faces is afforded by a projecting portion of a concaved cheek-piece, of which there are four alike in form, as shown in Figs. 15, 16, and 17 in section, top, and side view. These cheek-pieces are mounted in a non-magnetic frame, one of each pair being above the other, as at $f$ $f'$ and $f^2$ $f^3$, the two pairs being separated by a lateral space occupied by an exciting-helix A, also mounted in said frame, and the cheeks in each pair are separated from each other. A drum-armature centrally occupies the interior space of the helix, and its ends occupy the concavities of each pair of cheeks, and the core of the armature is of iron, which, being magnetized, has at one end an N pole and at the other end an S pole, and the two cheeks at the N end of the armature are therefore oppositely polarized by induction, as indicated by S′, and those at the opposite or S end of the armature are polarized, as indicated by N′. It will be seen that when the armature is revolved no electric current can be developed in the armature-conductors, because of the normally-balanced magnetic condition of the central field at the two ends of the armature, one cheek of each pair neutralizing the other cheek on the same side of the armature, so far as relates to any capacity for developing an electric current. By applying a piece of magnetic metal to, say, the faces $c$ and $d'$ this balanced condition at the central field will no longer exist, because then there will be a completed magnetic circuit from, say, the cheek $f^3$ to the armature-core at its under side at one end, along the core to the cheek $f$ at the upper side at the other end of the core, and thence by way of the applied piece of metal to the cheek $f^3$ again, and as a result thereof a current will be developed in the armature-winding proportioned to the magnetic conductivity of the applied piece of metal. As this form of magnet does not admit of the use of a needle which can be directly influenced by variations in the central magnetic field, the winding of the armature serves as a means of communication between the magnetic field and an indicator B′, which, although an ordinary galvanometer, is in this case a true magnetic indicator, which is indirectly influenced by variations in the central magnetic field, because the variations in the direct influence of the magnet upon the windings of the armature are promptly communicated by way of a commutator, its brushes, and an electric circuit to the indicator. With the magnetic field in its normal condition and the armature in motion the needle of the magnetic indicator will stand, say, at zero; but on the application of a piece of magnetic metal to the two faces on either side of the gage the indicator-needle will be promptly moved and will disclose a measurement of the current in exact proportion to the magnetic conductivity of the piece of metal thus applied. If, then, a second piece of metal of like cross-section as the first be applied to the contact-faces on the opposite side of the gage, the needle of the indicator will return to its normal position if the two pieces of metal have the same magnetic conductivity; but if not the needle will promptly disclose that fact, and then by adding appropriate pieces of metal to that piece which is deficient the needle will be brought to zero, and the pieces of metal thus added indicate differences in dimensions, which correspond to the differences in magnetic conductivity originally disclosed by the indicator. With this form of gage differences as low as one-half of one per cent. can be accurately determined, and differences in the resistance of two pieces of iron of like cross-section and permeability, but of different lengths, can also be readily measured.

For making comparative tests of metal the latter is preferably in sheet form, cut into strips of uniform size, and these strips are preferably applied edgewise to the contact-faces, as shown at $g$ and $h$ in Fig. 11, and with these I use the fractional series of pieces, as illustrated in Fig. 14. It will be seen that in each of the gages shown there are two pairs of magnetic contact-faces adapted to receive pieces of metal to be tested, and in each the magnetic coupling of any one face with another of opposite polarity causes a variation in certain portions of a magnetic field, and that this variation is promptly disclosed by a magnetic indicator, and also that in each of said gages the magnetic variation in the central field caused by coupling either two of the contact-faces will be balanced by coupling the other two, and if but one pair of the contact-faces of either gage be used for successively receiving pieces of metal to be tested the magnetic indicator, by the various positions assumed by the needle with relation to the marks on the scale-plate, will disclose in a well-defined manner such differences as may exist in the magnetic conductivity of the pieces tested. It will also be seen that in each of these gages there is a centralized magnetic field, which has normally no influence upon the magnetic indicator other than to maintain the needle of the indicator in its normal position, and also an external or outside magnetic field, within which the magnetic contact-faces are located, and that all changes in said external field cause corresponding changes in the central field, which are promptly disclosed by the magnetic indicator. It will also be seen that in each of these gages there are two open magnetic circuits, and that in each circuit there are two magnetic contact-faces, and also a magnetic indicator, which responds to the slightest closure of either circuit, and it therefore indicates the magnetic conductivity of such metal as has been applied to said contact-faces.

Having thus described my invention, I claim as new and desire to secure by Letters Patent—

1. In a magnetic gage for testing the magnetic conductivity of metals, a central magnetic field, two or more contact-faces located within an external or outer magnetic field and adapted to receive pieces of metal to be tested, and a magnetic indicator which is normally uninfluenced by said central field in its normal condition, but will respond to changes or variations in said central field resulting from changes or variations in said outer field, as when any two of said contact-faces are temporarily connected by metal having more or less magnetic conductivity.

2. In a magnetic gage for testing the magnetic conductivity of metals, two open magnetic circuits, contact-faces in either or both circuits, adapted to receive pieces of metal to be tested, and a magnetic indicator which responds to variations in either or both of said circuits and discloses the extent to which either or both of them are closed, as by the application to said faces of metal to be tested, said indicator being influenced in its movements in proportion to the magnetic conductivity of metal thus applied.

RUDOLF EICKEMEYER.

Witnesses:
   JAMES S. FITCH,
   RUDOLF EICKEMEYER, Jr.